US012568513B2

(12) United States Patent　　　　　(10) Patent No.:　US 12,568,513 B2

Agrawal et al.　　　　　　　　　　　　(45) Date of Patent:　　　Mar. 3, 2026

(54) MULTI-LINK RANGE EXTENSION

(71) Applicant: MAXLINEAR, INC., Carlsbad, CA (US)

(72) Inventors: Abhishek Kumar Agrawal, Fremont, CA (US); Imran Latif, Fremont, CA (US); Sigurd Schelstraete, Menlo Park, CA (US); Hossein Dehghan, Diablo, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 0 days.

(21) Appl. No.: 18/427,713

(22) Filed: Jan. 30, 2024

(65) Prior Publication Data

US 2024/0215056 A1　　　Jun. 27, 2024

Related U.S. Application Data

(62) Division of application No. 17/038,013, filed on Sep. 30, 2020, now Pat. No. 11,889,532.

(Continued)

(51) Int. Cl.
　　*H04W 72/51*　　　(2023.01)
　　*H04B 1/00*　　　(2006.01)
　　(Continued)

(52) U.S. Cl.
　　CPC .......... *H04W 72/51* (2023.01); *H04B 1/0053* (2013.01); *H04L 5/0041* (2013.01);
　　(Continued)

(58) Field of Classification Search
　　CPC . H04W 72/51; H04W 72/044; H04W 72/541; H04B 1/0053; H04L 5/0041; G16Y 10/75
　　See application file for complete search history.

(56) References Cited

U.S. PATENT DOCUMENTS 10,098,110　B2　10/2018　Choi et al.
10,652,860　B2　　5/2020　Zhou et al.
(Continued)

FOREIGN PATENT DOCUMENTS

CN　　　107836132　A　　3/2018
CN　　　107926006　A　　4/2018
(Continued)

OTHER PUBLICATIONS

Office Action for Chinese Application No. 202011231356.8, dated Nov. 29, 2023, 18 pages.
(Continued)

*Primary Examiner* — Chae S Lee
(74) *Attorney, Agent, or Firm* — Buchalter; Jason W. Croft

(57)　　　　　ABSTRACT

Methods and systems may include processes by which the reliability and robustness of a wireless network may be improved. In some implementations, a method may include selecting at least two resource units to be used for communications to a single client device; and transmitting data in duplicate via each of the at least two resource units to the client device such that the client device is able to combine the data from each of the at least two resource units into a single instance of the data. In some implementations, a method may include obtaining notification of one or more ranges of frequencies corresponding to a set of resource units to be avoided in a spectrum of available frequencies, and allocating resource units to a set of client devices that covers the available frequencies while excluding the set of resource units to be avoided.

18 Claims, 8 Drawing Sheets

Related U.S. Application Data

(60) Provisional application No. 63/011,153, filed on Apr. 16, 2020, provisional application No. 62/933,088, filed on Nov. 8, 2019.

(51) Int. Cl.

| | | |
|---|---|---|
| *H04L 5/00* | (2006.01) | |
| *H04W 72/044* | (2023.01) | |
| *H04W 72/541* | (2023.01) | |
| *G16Y 10/75* | (2020.01) | |

(52) U.S. Cl.
CPC ....... *H04W 72/044* (2013.01); *H04W 72/541* (2023.01); *G16Y 10/75* (2020.01)

(56) References Cited

U.S. PATENT DOCUMENTS

| | | | |
|---|---|---|---|
| 11,457,457 B2 | 9/2022 | Priyanto et al. | |
| 11,581,989 B2 | 2/2023 | Suh et al. | |
| 11,889,532 B2 | 1/2024 | Agrawal et al. | |
| 2015/0117227 A1 | 4/2015 | Zhang et al. | |
| 2016/0164831 A1 | 6/2016 | Kim | |
| 2016/0330058 A1 | 11/2016 | Chen et al. | |
| 2016/0330753 A1 | 11/2016 | Jauh et al. | |
| 2017/0041929 A1* | 2/2017 | Noh ..................... H04L 5/0037 |
| 2019/0109684 A1 | 4/2019 | Chen et al. | |
| 2019/0253296 A1 | 8/2019 | Chen et al. | |
| 2019/0268880 A1* | 8/2019 | Zhou .................... H04B 17/318 |
| 2019/0380117 A1* | 12/2019 | Verma .................. H04L 5/0007 |
| 2020/0305164 A1* | 9/2020 | Yang ..................... H04L 5/0007 |
| 2021/0143955 A1 | 5/2021 | Yang et al. | |
| 2021/0153031 A1* | 5/2021 | Sugaya ............ H04W 72/0453 |
| 2021/0274552 A1 | 9/2021 | Nezou et al. | |
| 2021/0367722 A1 | 11/2021 | Noh et al. | |
| 2022/0109548 A1* | 4/2022 | Thubert ............... H04W 16/10 |
| 2023/0361969 A1 | 11/2023 | Noh et al. | |

FOREIGN PATENT DOCUMENTS

| | | | |
|---|---|---|---|
| EP | 2744141 A1 | 6/2014 | |
| EP | 3098999 A1 | 11/2016 | |
| KR | 20190080092 A | 7/2019 | |
| WO | 2021071149 A1 | 4/2021 | |

OTHER PUBLICATIONS

Kousaridas et al., "Multi-Connectivity Management for 5G V2X Communication", 2019 IEEE 30th Annual International Symposium on Personal, Indoor and Mobile Radio Communications (PIMRC), Istanbul, Turkey, Sep. 8-11, 2019, 7 pgs.

Yang et al., "Fast Rerouting Against Multi-Link Failures Without Topology Constraint", IEEE/ACM Transactions on Networking, vol. 26, No. 1, Feb. 2018, pp. 384-397.

Notice of Allowance for Chinese Patent Application No. 202011231356.8 dated May 17, 2024, 10 pgs with translation.

* cited by examiner

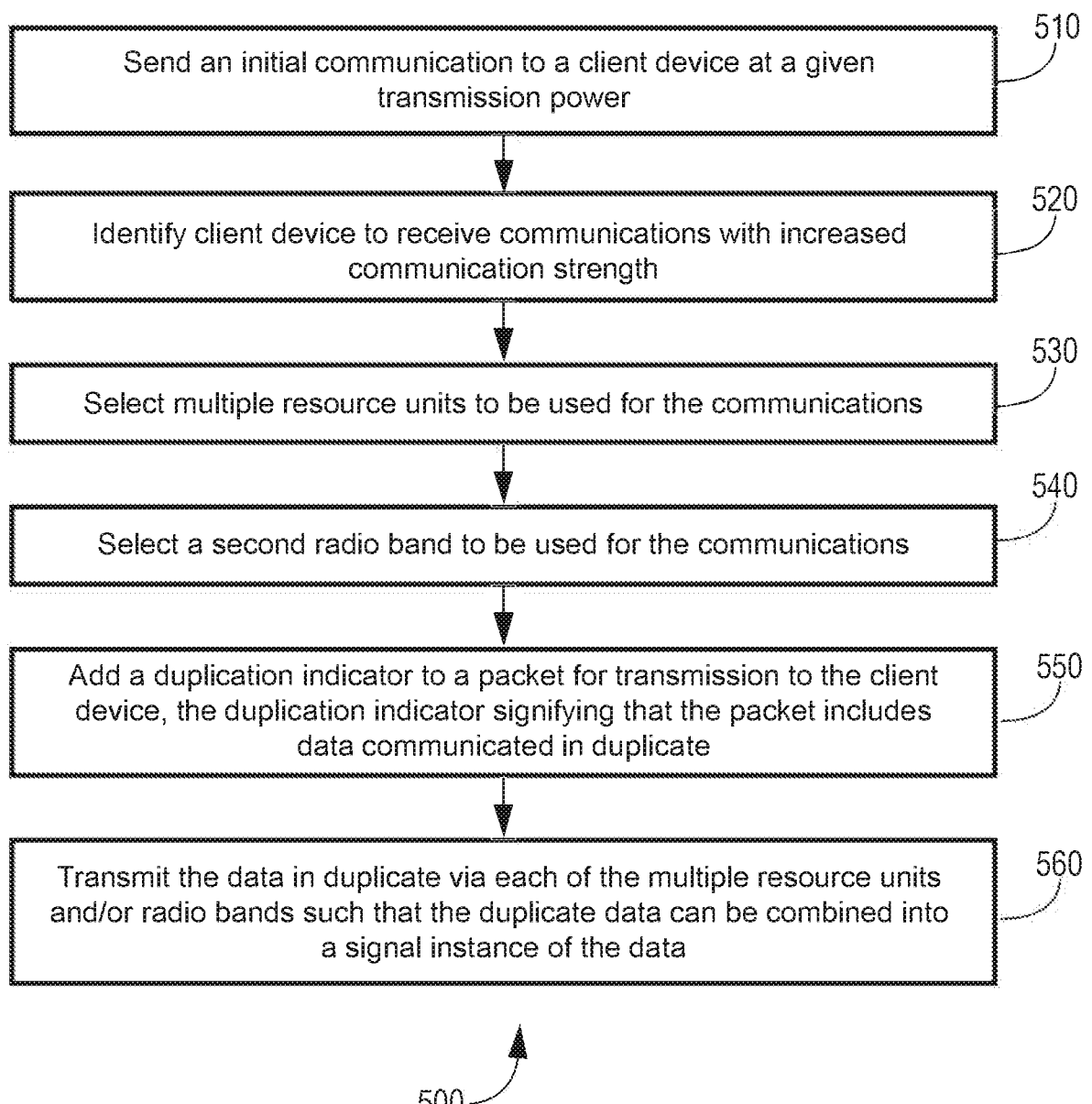

510

Send an initial communication to a client device at a given transmission power

520

Identify client device to receive communications with increased communication strength

530

Select multiple resource units to be used for the communications

540

Select a second radio band to be used for the communications

550

Add a duplication indicator to a packet for transmission to the client device, the duplication indicator signifying that the packet includes data communicated in duplicate

560

Transmit the data in duplicate via each of the multiple resource units and/or radio bands such that the duplicate data can be combined into a signal instance of the data

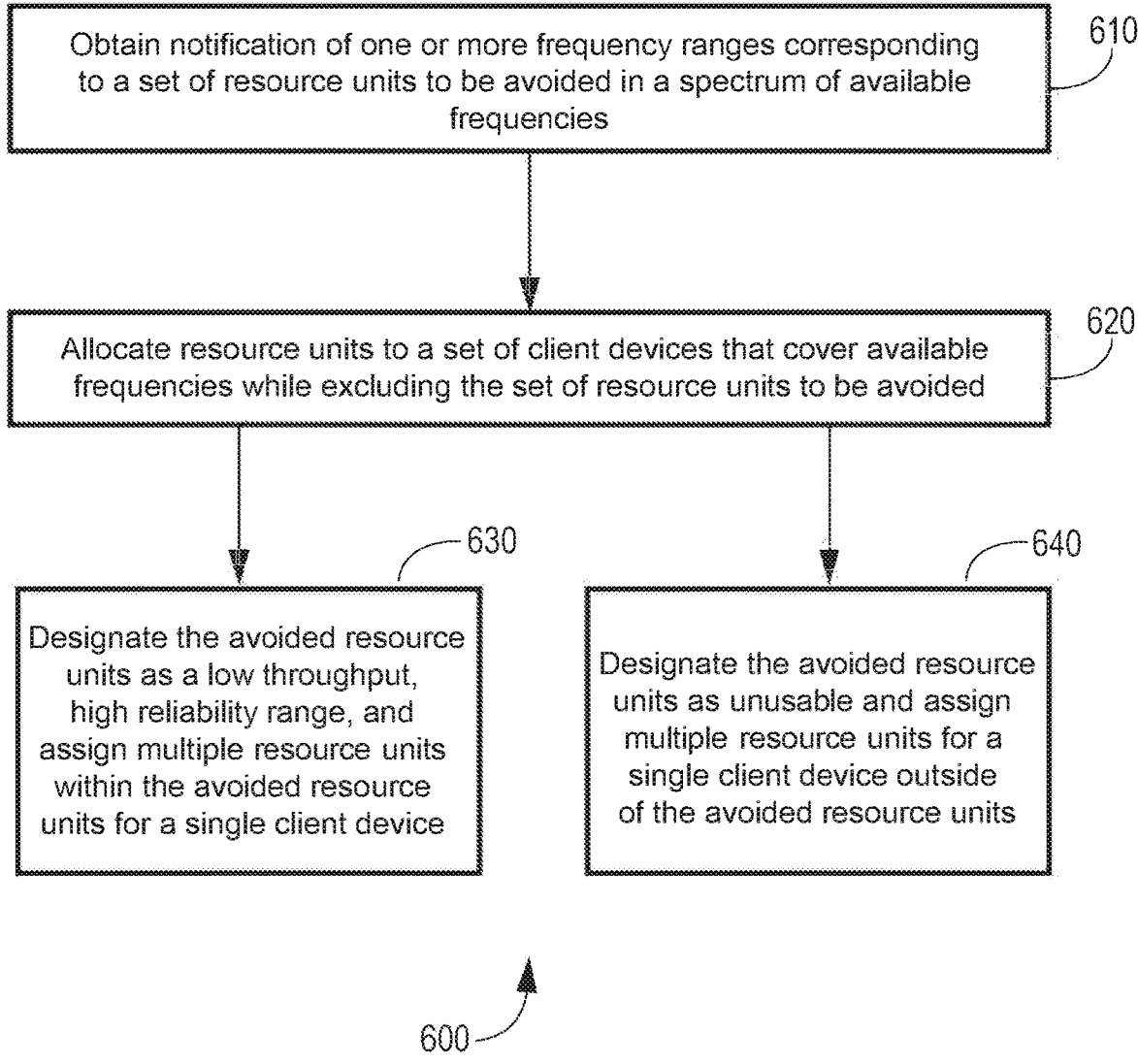

Obtain notification of one or more frequency ranges corresponding to a set of resource units to be avoided in a spectrum of available frequencies    610

Allocate resource units to a set of client devices that cover available frequencies while excluding the set of resource units to be avoided    620

630

Designate the avoided resource units as a low throughput, high reliability range, and assign multiple resource units within the avoided resource units for a single client device

640

Designate the avoided resource units as unusable and assign multiple resource units for a single client device outside of the avoided resource units

Monitor various frequencies for interference

720

No          Is the interference of one or more ranges of the various frequencies above a first threshold?

Yes          730

Designate the one or more ranges as to be avoided

740

Periodically monitor to be avoided frequencies for interference

750

Is the interference below a second threshold?          No

Yes          760

Remove the designation of to be avoided

700

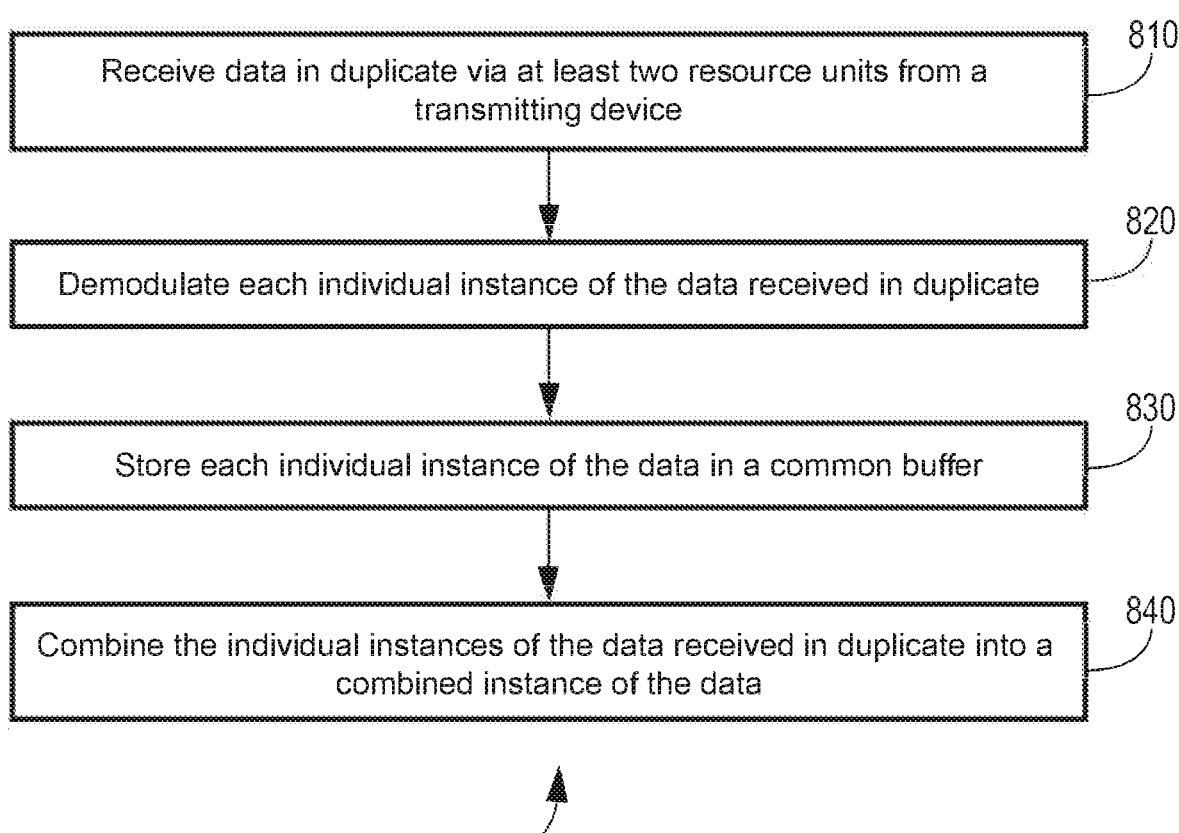

810

Receive data in duplicate via at least two resource units from a transmitting device

820

Demodulate each individual instance of the data received in duplicate

830

Store each individual instance of the data in a common buffer

840

Combine the individual instances of the data received in duplicate into a combined instance of the data

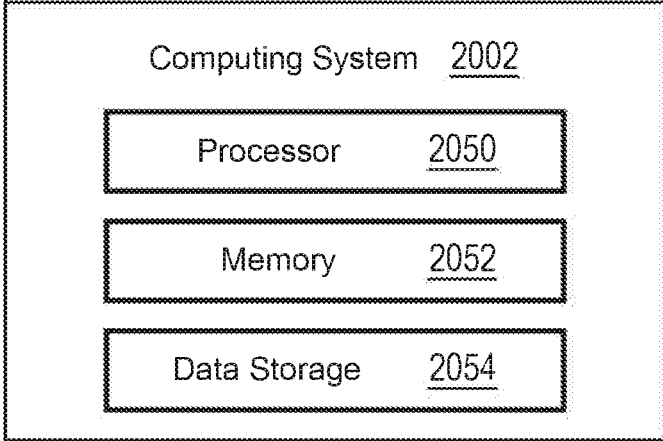

Computing System  2002

Processor      2050

Memory      2052

Data Storage      2054

FIG. 9

MULTI-LINK RANGE EXTENSION

CROSS-REFERENCE TO RELATED APPLICATION

This patent application is a divisional of U.S. patent application Ser. No. 17/038,013, filed Sep. 30, 2020 titled "MULTI-LINK RANGE EXTENSION", which claims the benefit of and priority to U.S. Provisional App. No. 62/933,088 filed Nov. 8, 2019 titled "MULTI-LINK RANGE EXTENSION," and the benefit of and priority to U.S. Provisional App. No. 63/011,153 filed Apr. 16, 2020 titled "FREQUENCY DUPLICATION IN 802.11 TRANSMISSION," each of which are incorporated by reference in the present disclosure in their entireties.

FIELD

The implementations discussed herein are related to multi-link range extension.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax", "ay", "be". Communications follow a hub and spoke model with a WAP at the hub and the spokes corresponding to the wireless links to each 'client' device or station (STA) utilizing the WLAN.

After selection of a single communication channel for the associated home network, access to the shared communication channel relies on a multiple access methodology identified as Collision Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with single antenna single stream or multiple-antenna multi-stream transceivers concurrently, thereby increasing the time available for discrete MIMO video links to wireless HDTVs, computers, tablets, and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units (RUs).

The IEEE 802.11n and 802.11ac standards support increasing degrees of complexity in the signal processing required of fully compliant WLAN nodes including beam-forming capability for focused communication of user data. One of the many capabilities of a fully compliant WLAN node under either of these standards is the ability to focus the signal strength of a transmitted communication toward a receiving device. Doing so requires multiple antenna and means for independently controlling the phase and amplitudes of the communication signals transmitted thereon.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to extending range, robustness, and/or reliability of stations in a multi-link network. Some implementations provide a method, system, and/or apparatus to facilitate the transmission of data in duplicate to the same station to increase the range, robustness, and/or reliability within the network.

One or more implementations may include an example method or system that includes selecting at least two resource units to be used for communications to a single client device; and transmitting data in duplicate via each of the at least two resource units to the client device such that the client device is able to combine the data from each of the at least two resource units into a single instance of the data.

Additionally, one or more implementations may include methods or systems that may include obtaining notification of one or more ranges of frequencies corresponding to a set of resource units to be avoided in a spectrum of available frequencies, and allocating resource units to a set of client devices that covers the available frequencies while excluding the set of resource units to be avoided.

One or more additional implementations may include an example client device that includes one or more processors, and one or more non-transitory computer-readable media containing instructions that, when executed by the one or more processors, cause the client device to perform operations. The operations may include receiving data in duplicate via at least two resource units from a transmitting device, and demodulating each individual instance of the data in duplicate. The operations may also include storing each of the individual instances of the data received in duplicate in a common buffer, and combining the individual instances of the data received in duplicate into a combined instance of the data, where the combined instance of the data has a higher received strength (e.g., SNR) compared to the individual instances of the data. In some implementations, the client device comprises a single antenna.

The present disclosure may be implemented in hardware, firmware, or software. Associated devices and circuits are also claimed. Additional features and advantages of the present disclosure will be set forth in the description which follows, and in part will be obvious from the present disclosure, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims or may be learned by the practice of the present disclosure as set forth hereinafter.

BRIEF DESCRIPTION OF THE DRAWINGS

Example implementations will be described and explained with additional specificity and detail through the use of the accompanying drawings in which:

FIG. 5 illustrates a flowchart of an example method of transmitting data in duplicate described according to at least one implementation of the present disclosure.

FIG. 6 illustrates a flowchart of an example method of designating certain resource units as to be avoided described according to at least one implementation of the present disclosure.

FIG. 8 illustrates a flowchart of an example method of receiving data in duplicate described according to at least one implementation of the present disclosure.

FIG. 9 illustrates a diagrammatic representation of a machine in the example form of a computing device described according to at least one implementation of the present disclosure.

DETAILED DESCRIPTION OF SOME EXAMPLE IMPLEMENTATIONS

Figure 1:
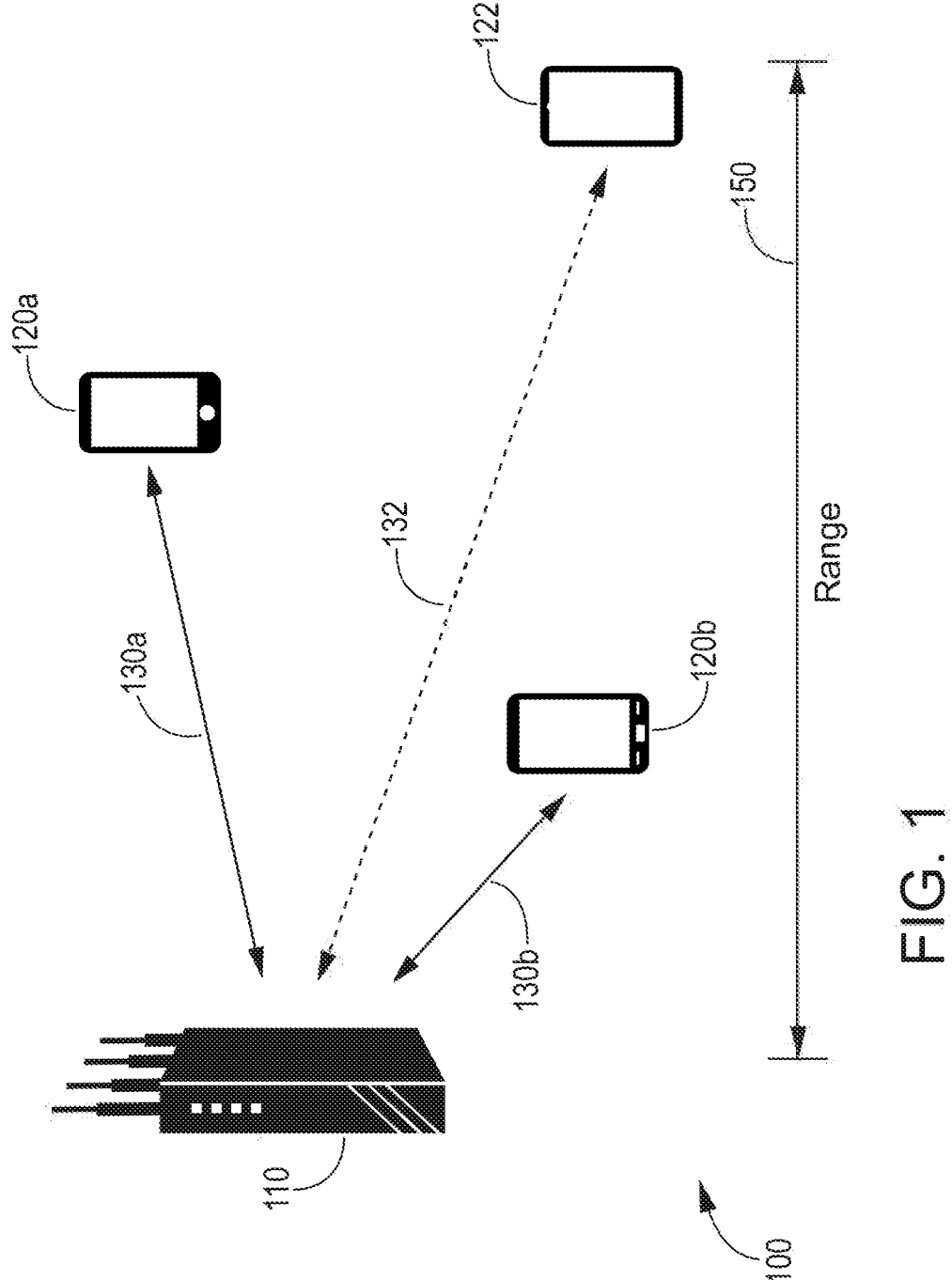
FIG. 1 illustrates an example wireless network within which range extension, robustness, and/or reliability may be accomplished, described according to at least one implementation of the present disclosure.

Robustness, reliability and throughput are three important features of a wireless network, such as a Wi-Fi network. However, there is usually a tradeoff between these features and depending on certain scenarios, only one or two of these features may be optimized, which may come at the expense of the other feature(s). Throughput has been a large focus among these three features in development and advancements, leading to data rates of 9.6 Gbps being achievable using the IEEE 802.11ax wireless standard. The 802.11ax wireless standard describes dual carrier modulation (DCM) as one approach to improve reliability. In DCM, the same information is modulated on a pair of subcarriers of a single RU assigned to a station to enhance the received signal-to-noise ratio (SNR) of the data transmission. However, even with DCM there are limitations preventing high levels of robustness and/or reliability for stations which suffer from extreme attenuations. Such extreme attenuation may be caused due to the station being very far from the AP, behind a thick wall, or suffering from high attenuation due to any other reason. Stations experiencing such high attenuation may suffer poor connection capabilities even from the connection setup stage with the AP. In some circumstances, these stations can include normal Wi-Fi clients, set-top boxes, critical Internet of Things (IoT) devices etc. For some of these stations like fixed devices (e.g., an IoT television mounted on a wall in a home), it is not possible to move the device around to get better coverage. Thus, a solution in which an extra level of robustness and reliability can be provided for such stations, for both connection setup stage and for reliable communication, is desirable and beneficial.

In older versions of the wireless standard 802.11, duplication of data may be performed for contiguous portions of bandwidth in 20 MHz portions of bandwidth. However, that was possible because such legacy standards kept transmission bandwidth to fixed 20 MHz portions and did not permit the variability observed in 802.11ax. Furthermore, there was no indication of the duplication in communications such that the receiving station was left to hypothesize duplication through blind detection methods. Thus, even in legacy versions of 802.11 that did permit transmission of data in duplicate, a solution of increased network range, reliability, etc. is desirable and beneficial, particularly when the variability observed in 802.11ax is considered.

Example implementations of the present disclosure include methods and systems which can provide an increase in received SNR at a station without necessarily changing the transmission power at the access point. For example, the present disclosure includes allocation of more than one RU to the same station; sending the same data for a specific station across the RUs that are allocated to that specific station, (e.g., each RU carries the same data and is modulated as if it is being sent to separate stations but in fact are transmitted to the same station). In some implementations, in addition to sending the same data across all allocated RUs of a given station, the same data may be sent across multiple radio bands (e.g., frequency bands) simultaneously and in a similar manner as it is sent on one link.

By using one or more of the principles of the present disclosure to transmit data in duplicate to a client station, network performance may be improved and/or efficiencies may be gained. For example, a station that is struggling with high attenuation may require repeatedly sending the same messages over and over, whether in attempting to establish a connection with an access point, or in sending user data to the station. By providing such stations with a more robust and/or reliable connection, the network may operate more efficiently overall by avoiding the repeated requests and transmissions, even if the throughput at any given instance in time may be slightly reduced. Additionally, more stations may be serviced at larger ranges and/or through more difficult attenuation due to the increased robustness and/or reliability. This may be particularly advantageous for stations that are unable to be moved. For example, an IoT television bolted to the wall cannot be moved to increase SNR with a wireless access point if the IoT television experiences high attenuation where it is bolted to the wall. By increasing the reliability and/or robustness to such a station, the station may still enjoy the benefits of access to the Internet via the wireless AP, despite being in a location where otherwise the station may not be able to access the Internet.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example wireless network 100 within which range extension and/or robustness and/or reliability improvements may be accomplished, in accordance with one or more implementations of the present disclosure. The network 100 may include a wireless access point 110 communicating with multiple stations 120, such as the client stations 120a and 120b over connections 130a and 130b, respectively. The connections 130a and 130b may be strong, reliable connections (e.g., due to the proximity of the stations 120a and 120b to the access point 110). The network 100 may also include a station 122 that is at or near the boundary of the range 150 of the access point 110, causing the connection 132 to be weak and/or unreliable.

In typical operation under wireless standards such as 802.11ax, there is a one to one mapping required for stations and RUs. For example, when constructing an OFDMA frame, the access point 110 may assign one RU to each of the stations 120a, 120b, and 122 according to the 802.11ax standard. However, the present disclosure may depart from and/or improve upon such operation.

In some implementations, to increase the robustness of the network 100, more than one RU may be assigned to a given station and data may be sent in duplicate to that station. For example, because the station 122 is at the periphery of the range 150 of the access point 110, the access point 110 may determine that it may be desirable to communicate with the station 122 using enhanced communications to increase the SNR between the access point 110 and the station 122. By assigning multiple RUs to a single station 122 and sending the data in duplicate in the multiple RUs, the station 122 is able to combine the multiple instances of the data into a single instance of the data. Doing so provides an increase in SNR at the station 122 enhancing the robustness, reliability, and/or effective range of the access point 110. An example of assigning multiple RUs to a single station when constructing an OFDMA frame is described with reference to FIG. 2.

When comporting with the 802.11ax standard, RU sizes can include 26 tones (for approximately 2 MHz of bandwidth for the RU), 52 tones (for approximately 4 MHz of bandwidth for the RU), 106 tones (for approximately 8 MHz of bandwidth for the RU), 242 tones (for approximately 20 MHz of bandwidth for the RUs), 484 tones (for approximately 40 MHz of bandwidth for the RUs), and 996 tones (for approximately 80 MHz of bandwidth for the RU). To provide an example quantification of the benefits of the present disclosure, all 242-tone RUs (for approximately 20 MHz of bandwidth for the RUs) may be allocated to the station 122. There are eight 242-tone RUs in 160 MHz of bandwidth. By sending the same data on all eight RUS, combining at the station 122 may provide a received SNR gain of $$10*\log_{10}(8)=9 \text{ dB}.$$

Similarly, following the example of using the 26-tone RU (corresponding to approximately 2 MHz of bandwidth for each respective RU), in 160 MHz total bandwidth there are seventy-four 26-tone RUs. Allocating all 26-tone RUs to the station 122 and combining data at the station 122 may provide the received SNR gain of $$10*\log_{10}(74)=18 \text{ dB}.$$

In some implementations, the data may be transmitted in duplicate over multiple radio bands. For example, the data may be sent over both the 2.4 GHz band and the 5 GHz band (in dual-band devices) or over the 2.4 GHZ, 5 GHZ, and 6 GHz bands (in tri-band devices). Doing so may provide additional gains, including as much as an additional 3 to 9 dB. When transmitting across multiple radio bands, each band may independently utilize its own modulation and coding scheme (MCS). For example, based on the specific channel and/or radio band quality, different MCS may be used such that a first MCS may be used in the 2.4 GHz band, a second MCS may be used in the 5 GHz band, and a third MCS may be used in the 6 GHz band. In such an implementation, the duplication of data may be tied to the lowest data rate of MCS such that higher data rate MCS transmissions may or may not use all available bandwidth. Additionally or alternatively, only portions of the data may be transmitted in duplicate such that the remaining available bandwidth of the higher data rate MCS may be data transmitted in single while the other bandwidth, in conjunction with the lower data rate MCS, may be transmitted in duplicate.

In these and other implementations, by reducing the overall throughput by sending the data in duplicate in the multiple RUs assigned to the station 122 and/or over multiple radio bands, a corresponding gain in SNR may be achieved. For example, the access point 110 may recognize that the station 122 repeatedly drops packets and/or otherwise struggles to maintain the connection 132 with the access point 110. In response, the access point 110 may increase the number of RUs assigned to the station 122. If the connection 132 with the station 122 continues to struggle, the access point 110 may continue to increase the number of RUs assigned to the station up until the maximum available bandwidth and smallest number of tones may be used (e.g., for 160 MHz of overall bandwidth assigning all seventy-four 26-tone RUs to the station 122 and/or over the 2.4 GHz, 5 GHZ, and 6 GHz bands). Using such variations, the access point 110 may tune the amount of gain desired based on the circumstances of the station for which enhanced communications are desired. For example, for certain thresholds of number of dropped packets, number of time-outs when forming a connection, etc. indicating enhanced communications with increased SNR may be desirable, a corresponding target amount of gain may be used when communicating with a given station.

In some implementations, at the access point 110, when passing a frame to the PHY layer for transmission, a number of parameters may be changed to be dependent on a given RU station, rather than merely dependent on one or the other. Table 1 (below) identifies a number of parameters that are dependent on both the RU (r) and the assigned station (u). The notation $AggRU_u$ may be used to indicate the set of all RUs assigned to the station/user u.

TABLE 1

| RU parameter | Explanation |
|---|---|
| $N_{SD,u,r}$ | Number of data subcarriers for station u RU $r \in AggRU_u$. |
| $N_{BPSCS,u,r}$ | Number of modulated bits per sub-carrier and per spatial stream for station u and RU $r \in AggRU_u$ |
| $N_{STS,u,r}$ | Number of space-time streams for station u and RU $r \in AggRU_u$. In some implementations, all RUs assigned to the station u use the same number of STS. In such implementations, $N_{STS,r,u} = N_{STS,u}$ for all RU $r \in AggRU_u$. |
| $R_{u,r}$ | Coding rate for station u and RU $r \in AggRU_u$. In some implementations, all RUs assigned to the station u use the same coding rate. In such implementations, $R_{r,u} = R_u$ for all $r \in AggRU_u$. |
| $N_{SD,SHORT,u,r}$ | Number of subcarriers in symbol segment for station u and RU $r \in AggRU_u$. Values for the different RU sizes are generally available, such as described herein and/or consistent with one or more implementations of 802.11ax. |
| $N_{CBPS,SHORT,u,r}$ | Number of coded bits in a symbol segment for station u and RU $r \in AggRU_u$<br>$N_{CBPS,SHORT,u,r} = N_{SD,\ SHORT,u,r} \times N_{STS,u,r} \times N_{BPSCS,u,r}$ |
| $N_{DBPS,SHORT,u,r}$ | Number of data bits in a symbol segment for station u and RU $r \in AggRU_u$<br>$N_{DBPS,SHORT,u,r} = R_{u,r} \times N_{CBPS,SHORT,u,r}$ |
| $N_{CBPSS,u,r}$ | Number of coded bits per space-time stream per symbol for station u and RU $r \in AggRU_u$.<br>$N_{CBPSS,u,r} = \Sigma_{r \in AggRU_u} N_{BPSCS,u,r} \times N_{SD,u,r}$ |
| $N_{CBPS,u,r}$ | Number of coded bits per symbol for station u and RU $r \in AggRU_u$.<br><br>$N_{CBPS,u,r} =$<br><br>$\Sigma_{r \in AggRU_u}\ N_{STS,u,r} \times N_{BPSCS,u,r} = N_{STS,u} \times \sum_{r \in AggRU_u} N_{BPSCS,u,r} \times N_{SD,u,r}$ |
| $N_{DBPS,u,r}$ | Number of data bits per symbol for station u and RU $r \in AggRU_u$.<br>$N_{DBPS,u,r} = R_{u,r} \times N_{CBPS,u,r}$ |

Using the values of parameters of Table 1, various parameters may be determined on a per station basis as illustrated in Table 2 (below). The values of Table 2 may be used when performing operations such as forward error correction (FEC) padding, stream parsing, segment parsing, binary convolutional coding (BCC), etc.

TABLE 2

| | |
|---|---|
| $N_{CBPS,u}$ | Total number of coded bits per symbol for station u<br><br>$N_{CBPS,u} = \sum_{r \in AggRU_u} N_{CBPS,u,r}$ |
| $N_{DBPS,u}$ | Total number of data bits per symbol for station u<br><br>$N_{DBPS,u} = \sum_{r \in AggRU_u} N_{DBPS,u,r}$ |
| $N_{CBPS,SHORT,u}$ | Total number of coded bits per symbol segment for station u<br><br>$N_{CBPS,SHORT,u} = \sum_{r \in AggRU_u} N_{CBPS,SHORT,u,r}$ |
| $N_{DBPS,SHORT,u}$ | Total number of data bits per symbol segment for station u<br><br>$N_{DBPS,SHORT,u} = \sum_{r \in AggRU_u} N_{DBPS,SHORT,u,r}$ |

When performing FEC padding pre-FEC padding and post-FED padding may proceed in a similar or comparable manner to that which typically occurs according to 802.11ax, but using values from Table 2 (incorporating both per station and per RU considerations). For example, for each station, the access point 110 may calculate (with the terms from Table 2 bolded):

$$N_{Excess} = \mathrm{mod}(8 \cdot APEP_{LENGTH_u} + N_{Tail} + N_{service}, m_{STBC} N_{DBPS,u})$$

$$a_{init,u} = \begin{cases} 4 \text{ if } N_{Excess} = 0 \\ \min\left(\left\lceil \dfrac{N_{Excess}}{m_{STBC} N_{DBPS,SHORT,u}} \right\rceil, 4\right) \text{ otherwise} \end{cases}$$

$$N_{SYM,init,u} = m_{STBC} \left\lceil \dfrac{8 \cdot APEP\_LENGTH_u + N_{Tail} + N_{service}}{m_{STBC} NB_{DBPS,u}} \right\rceil$$

Using the values above, the padding may continue following the flow specified in 802.11ax. Scrambler implementation may be unchanged (e.g., each station may be scrambled independently). Coding may largely follow the same flow described in IEEE 802.11ax, but using the values identified in Table 2.

For example, for Low Density Parity Check (LDPC), the access point 110 may calculate (with the terms from Table 2 bolded):

$$N_{pld,u} = (N_{SYM,init} - m_{STBC}) N_{DBPS,u} + m_{STBC} N_{DBPS,last,}{}_{init,u}$$

$$N_{avbits,u} = (N_{SYM,init} - m_{STBC}) N_{CBPS,u} + m_{STBC} N_{CBPS,last,}{}_{init,u}$$

For BCC, the information bits and pre-FEC padding bits of station u may be encoded by a rate R=½ convolutional encoder and punctured as describe in 802.11ax.

The stream parser may remain largely unchanged in implementations in which multiple RUs are assigned to a single station and all RUs use the same modulation. However, in order to allow for more generic allocation of MCS, an example implementation of the stream parser can accommodate different MCS for different RUs in circumstances in which multiple RUs are assigned to a single station. In such implementations, since coding is still done per user (not per RU), the coding rate of all MCS in an aggregate RU may be the same.

For traditional operation of the stream parser, the stream parser may divide the bits at the output of the FEC encoder into $N_{SS}$ blocks of $N_{CBPSS}$ bits per symbol (or $N_{SS,u}$ blocks of $N_{CBPSS,u}$ bits per station in the case of multi-user transmissions). The operation is achieved by assigning s bits to each spatial stream in round-robin fashion, with $$s = \max\left(1, \frac{N_{BPSCS}}{2}\right).$$

The input into the stream parser is a block of $N_{CBPS,u}$ bits $b_i$. The output are $N_{SS,u}$ blocks of $N_{CBPSS,u}$. Bit k of block $i_{SS}$ is identical to input bit $b_i$, with i given by:

$$i = (i_{SS} - 1)s_u + S_u\left\lfloor \frac{k}{N_{ES} \cdot s_u} \right\rfloor + k \bmod s_u$$

And:

$$s_u = \max\left(1, \frac{N_{BPSCS,u}}{2}\right)$$

$$S_u = N_{SS,u}s_u$$

$$k = 0, \ldots, N_{CBPSS,u} - 1$$

$$i_{SS} = 1, \ldots mN_{SS,u}$$

$$i = 0, \ldots, N_{CBPS,u} - 1$$

$$N_{ES} = 1 \text{ for } 802.11ax.$$

In circumstances in which multiple RUs are assigned to a single station (such as to the station 122) consistent with the present disclosure, multiple values of $s_u$ and $S_u$ may be possible, (e.g., one for each RU). In such implementations, the operation of the stream parser may be generalized as follows:

$$i = (i_{SS} - 1)s_{u,1} + S_{u,1}\left\lfloor \frac{k}{N_{ES} \cdot s_{u,1}} \right\rfloor + k \bmod s_{u,1}, k = 0, \ldots, N_{CBPSS,u,1} - 1$$

$$i = (i_{SS} - 1)s_{u,2} + S_{u,2}\left\lfloor \frac{k}{N_{ES} \cdot s_{u,2}} \right\rfloor + k \bmod s_{u,2},$$

$$k = N_{CBPSS,u,1}, \ldots, N_{CBPSS,u,1} + N_{CBPSS,u,2} - 1$$

$$\vdots$$

$$i = (i_{SS} - 1)s_{u,M} + S_{u,M}\left\lfloor \frac{k}{N_{ES} \cdot s_{u,M}} \right\rfloor + k \bmod s_{u,M},$$

$$k = \sum_{r=1}^{M-1} N_{CBPSS,u,r}, \ldots, \sum_{r=1}^{M} N_{CBPSS,u,r} - 1$$

With M=the number of RUs allocated to station u;

$$s_{u,r} = \max\left(1, \frac{N_{BPSCS,u,r}}{2}\right);$$

and $S_{u,r}=N_{SS,u}s_{u,r}$.

If all of the RUs assigned to the single station use the same modulation, the above calculations reduce to the same case as for 802.11ax. In these and other circumstances, each of the assignment of bits may follow a similar or comparable round-robin assignment to the separate streams.

A segment parser may only operate for a 160 MHz and 80+80 MHz transmission with a 2×996-tone RU, or in other words, when a full 160 MHz bandwidth transmission is assigned to a single station. By design, there cannot be multiple RUs assigned to the same station in such a circumstance. As such, the segment parser may be bypassed (e.g., the output of the segment parser may be set as the input to the segment parser) whenever multiple RUs are assigned to a single station.

When performing BCC interleaving with a one to one mapping of stations to RUs, the bits are interleaved in blocks of $N_{CBPSS,u}$. In circumstances in which multiple RUs are assigned to a single station, the block of $N_{CBPSS,u}$ bits includes a concatenation of blocks with $N_{CBPSS,u,r}$ bits. Each of these sub-blocks may be interleaved separately.

When performing constellation mapping, each block of $N_{CBPSS,u,r}$ may be mapped to a set of $N_{SD,r,u}$ constellation points with $N_{BPSCS,u,r}$ bits. The constellation mapper may map each RU separately to produce the correct constellation points, even if different RUs are assigned to the same station. Different RUs may utilize different modulations, even though assigned to the same station.

When performing Low Density Parity Check (LDPC) Tone mapping, tone indices are rearranged through a form of block interleaving. The parameters of the block interleaver depend on the number of data tones in the RU (e.g., $N_{SD}$). In circumstances in which multiple RUs are assigned to a single station, each RU goes through the tone mapping separately, with interleaver parameters that correspond to the size of the RU in question. In some implementations, the LDPC tone mapping is executed in the bit domain. In this case, the LDPC tone mapping may be executed per RU in the bit domain.

Various other operations may already be performed on each tone/spatial stream separately, and as such, may be generally unchanged. For example, space time block coding (STBC) is performed on each tone and spatial stream separately, and as such, operates independent of which station is assigned an RU. As another example, pilot insertion is performed per RU and as such, operates independent of which station is assigned an RU. As an additional example, spatial mapping is performed per tone and as such, operates independent of which station is assigned an RU.

In some implementations, the station 122 may include programming and/or hardware capable of combining the data received in duplicate over the multiple RUs and/or radio bands. For example, the station 122 may be configured to combine the multiple distinct instances of the data sent in duplicate before equalization and/or before demodulating the data at a log likelihood ratio (LLR) level of demodulation. Additionally or alternatively, when sending across multiple radio bands, the station may be configured to demodulate the data across the multiple radio bands in a synchronized manner, and concatenate the duplicate data after a Fast Fourier Transform (FFT) of the data and storing the data in a common buffer or other storage area. During HE-LTF, the station 122 may determine the channel for all subcarriers that fall within the RUs that are assigned to the station 122. When identifying the channels during HE-LTF for all the subcarriers, the station 122 may utilize multiple or even all pilot carriers that are present in the signal. This can also include pilot carriers that are assigned to other RUs than those assigned to the station 122.

In some implementations, the station 122 may process the preamble of a packet containing data in duplicate to identify which RUs are assigned to the station 122, such as by analyzing a SIG field of the packet. In the 802.11ax wireless standard, a station stops processing such a field as soon as it has found the first instance of its identifier as only single RU is assigned to the station. However, according to the present disclosure as multiple RUs are assignable to a station, the station 122 may continue to analyze the entire set of assignment of RUs such that the station 122 is aware of all the RUs assigned to the station 122.

When the station 122 performs time domain and/or MIMO processing, performing equalization may include FFT output that facilitates equalization of all the tones that fall in the RUs that are assigned to the station 122. Common phase error (CPE) correction may be based on all available pilot tones. The segment deparser is used for a 160 MHz or 80+80 MHz transmission with a 2×996-tone RU, or in other words, when the full 160 MHz bandwidth is assigned to a single station. By design, there cannot be multiple RUs to the same station for this case. As such, the segment deparser may be bypassed (e.g., by setting the output of the segment deparser as the input) whenever multiple RUs are assigned to a single station (such as to the station 122). FEC decoding can perform decoding, using parameters assigned on a per RU basis as described above with reference to the access point 110, rather than merely a per-station basis. A descrambler may perform an inverse operation of a scrambler at the access point 110, using the seed extracted from the SERVICE field. Other receive functions can include tracking, which may be performed based on pilot phase values calculated over all available pilot tones, and an FEQ update which may be performed for all tones that fall within the RUs assigned to the station 122.

In some implementations, the station 122 may or may not have multiple antennas. For example, even with a single antenna, the station 122 may be able to obtain the benefit of multiple RUs being assigned to the station 122. In these implementations, the multiple RUs may arrive at different times or at different frequencies (e.g., according to an OFDMA frame as designated by the access point 110), and may be demodulated and combined by the station 122 as received by the single antenna.

By providing the data in duplicate across multiple RUs and/or across multiple radio bands, the power spectral density (PSD) is not increased as the same transmission power may be used across the same frequencies while still improving SNR. When compared to increasing the total transmit power rather than transmitting the same data in duplicate, the duplication of data may permit the use of certain analog components such as power amplifiers (PAs) and/or low noise amplifiers (LNAs) at either the access point 110 or the station 122. Such components may appear in older devices and may be inconsistent with other potential approaches to increase robustness, range, and/or reliability, while the present disclosure can still accommodate such components in certain implementations. For example, by increasing the total transmit power, the analog components (e.g., PAs and/or LNAs) may have more stringent manufacturing and operating requirements, with which some legacy devices may or may not be compatible.

In some implementations, when sending data in duplicate, the access point 110 may include a duplication indicator in the packets containing the data being transmitted in duplicate, or may be included in other signaling to the station 122. For example, one of the SIG fields in the header of a packet may include an indication that the user data of the packet is part of a transmission including data in duplicate. The indication may identify which frequency ranges, RUs, etc. are carrying the data in duplicate. Additionally or alternatively, the indication may indicate an order of duplication. In some implementations, frequency bands for transmissions of data in duplicate may be fixed or pre-configured at one or both of the access point 110 and the station 122 such that indication that the data is transmitted in duplicate and/or an order of the duplicated data may be sufficient to confidently demodulate and combine the data. In some implementations, the duplication indicator may indicate that the station 122 is to receive data in duplicate until informed otherwise. For example, the access point 110 may determine that the high attenuation condition may not resolve with a threshold time and as such, may decide to transmit data in duplicate for a period of time and/or indefinitely, and the duplication indicator may convey that decision.

In some implementations, when designating RUs to stations (e.g., by a message, packet, or settings between a MAC and PHY layer when constructing an OFDMA frame), the AP 110 may include one or more settings that designate how many RUs are allocated in the available bandwidth, starting positions of RUs within the bandwidth (such as the indices illustrated in FIGS. 2 and 3), the size of the individual RUs, and/or which station identifiers are assigned to certain RUs. Additionally or alternatively, an identification of MCS may be performed per station and/or per RU. In some circumstances, a coding rate may be consistent across all data being transmitted to the station.

Modifications, additions, or omissions may be made to the environment 100a without departing from the scope of the present disclosure. For example, the designations of different elements in the manner described is meant to help explain concepts described herein and is not limiting. Further, the environment 100a may include any number of other elements or may be implemented within other systems or contexts than those described. For example, any number of APs 110 and/or stations 120 may be included. While one mathematical approach is illustrated for determining and combining the correlational relationships between the antennas, any such mathematical approach can be implemented as disclosed herein by one of ordinary skill in the art.

Additionally, the teachings are applicable to any type of wireless communication system or other digital communication systems. For example, while stations and access points are described for one context of wireless communication, the teachings of the increased range, robustness, and/or reliability by sending data in duplicate are also applicable to other wireless communication such as Bluetooth®, Bluetooth Low Energy, Zigbee®, Thread, mmWave, etc.

Figure 2:
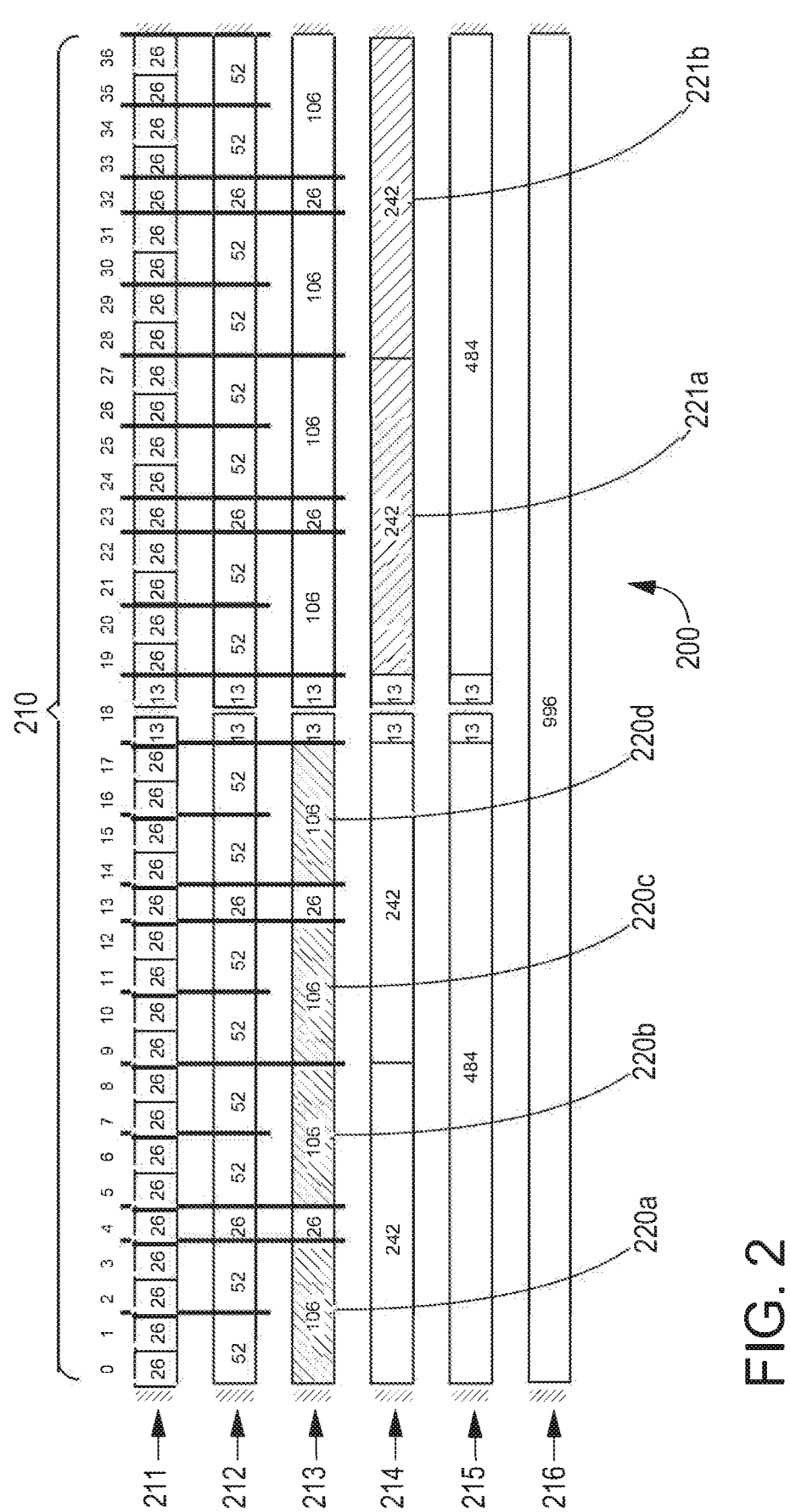
FIG. 2 illustrates an example set of resource units with multiple resource units assigned to the same station described according to at least one implementation of the present disclosure.

FIG. 2 illustrates an example set of resource units (RUS) 200 with multiple RUs assigned to the same station, in accordance with one or more implementations of the present disclosure. The set 200 of RUs may include an example range 210 of 80 MHz of bandwidth, such as that covered in a basic service set (BSS). As illustrated, the rows 211-216 illustrate the number of potential RUs when using RUs of 26 tones, 52 tones, 106 tones, 242 tones, 484 tones, and 996 tones, respectively.

When generating a multiplexed frame and assigning certain RUs to given stations, an access point may assign multiple RUs to the given stations. Using an example of two stations, the station may assign four 106 tone RUs 220a (such as the RUs 220a, 220b, 220c, and 220d) to a first station, and may assign the 242 tone RUs 221a and 221b to the second station. Using the multiple RUs for the first station, the same approximately 8 MHz bandwidth-worth of data may be transmitted in the 106 tone RU 220a as one instance and also sent three additional times as three additional instances of the data in the three other 106 tone RUs

220b-220d. Using the multiple RUs for the second station, the same approximately 20 MHz bandwidth-worth of data may be transmitted in the 242 tone RU 221a as one instance of the data and also sent one additional time as an additional instance of the data in the 242 tone RU 221b. In these two examples, the first station would have a higher SNR than that of the second station, and both would have higher SNR than a station assigned a single RU. Furthermore, the second station would enjoy a higher data rate than that of the first station, despite having the same system bandwidth assigned to the two stations.

It will be appreciated that any size of RU may be used when assigning RUs to stations, and different stations may use different sizes of RU tones for submission of the data. For example, the access point may assign the first station RUs that are 26 tones in size (corresponding to 2 MHz of bandwidth) as the size of data.

In some implementations, the indices illustrated above the row 211 representing the range 210 may be used to identify where certain RUs begin. For example, the RU 220a may be designated as starting at index 0, the RU 220b may be designated as starting at index 19, the RU 220c may be designated as starting at index 24, and the RU 220d may be designated as starting at index 28. In some implementations, a size of the RUs may be identified by indicating the row of rows 211-216 to which the RU belongs.

Figure 3:
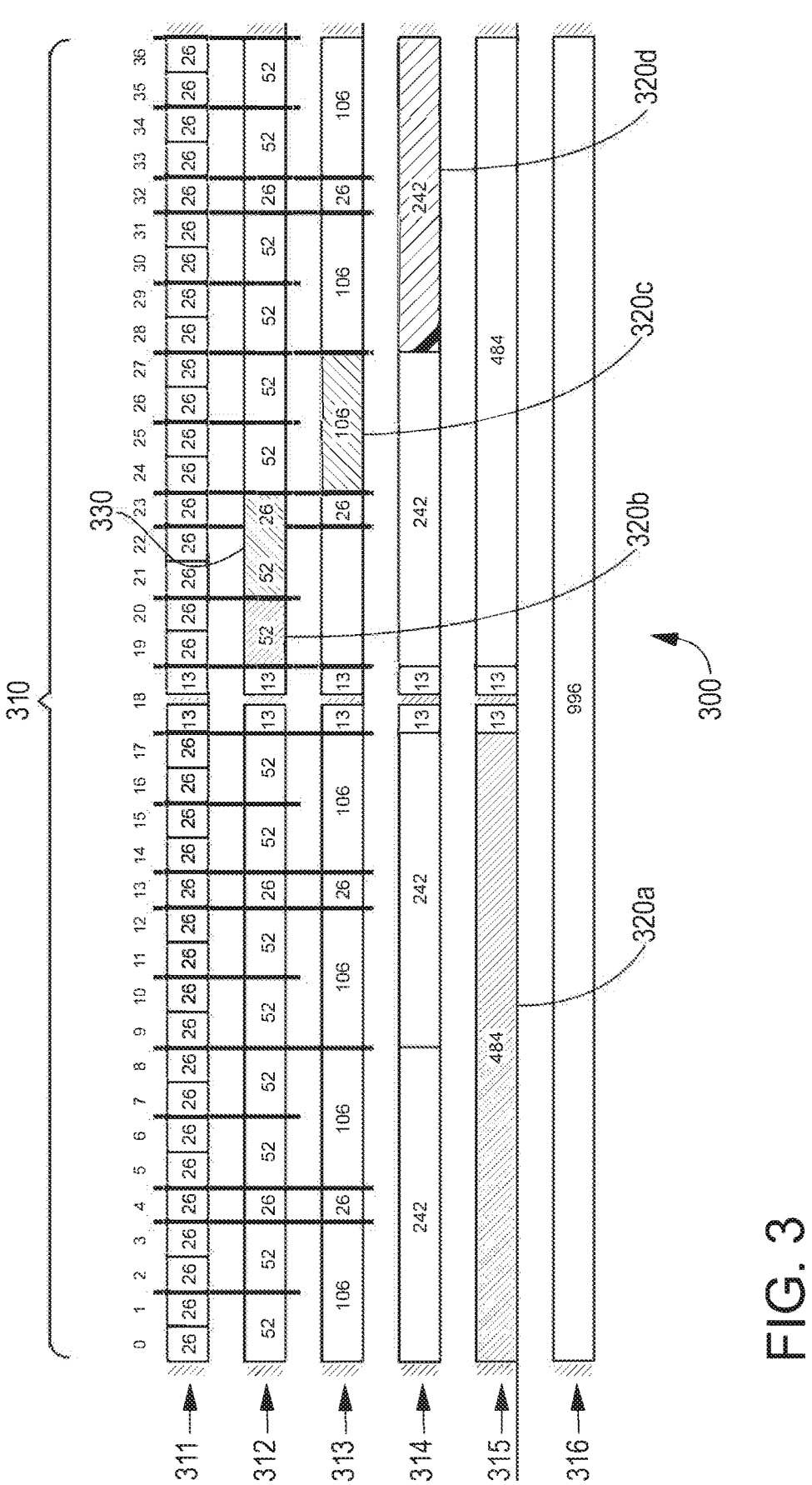
FIG. 3 illustrates another example set of resource units where certain ranges of frequencies are designated as to be avoided described according to at least one implementation of the present disclosure.

FIG. 3 illustrates another example set of RUs 300 where certain ranges of frequencies are designated as to be avoided, in accordance with one or more implementations of the present disclosure. The set of RUs 300 may be similar or comparable to that illustrated in FIG. 2, including the range 310 of 80 MHz and the rows 311-316 corresponding to RUs of 26 tones, 52 tones, 106 tones, 242 tones, 484 tones, and 996 tones, respectively.

In some implementations, a set of frequencies 330 which may or may not correspond to one or more RUs, may be designated as to be avoided. By designating the set of frequencies 330 as to be avoided, the station may be able to assign RUs around the avoided frequencies while still assigning the remainder of RUs to stations such that more of the bandwidth of the range 310 may be used.

In some implementations, the set of frequencies 330 may be identified as to be avoided according to any of a number of reasons. For example, the access point may monitor for interference and if interference is repeatedly experienced for a certain frequency range, the RUs corresponding to that frequency range may be designated as to be avoided. As another example, if failed delivery frequently occurs at the certain frequency range, the RUs corresponding to that frequency range may be designated as to be avoided. As a further example, historical readings or transmission success rates, information from other devices, etc. may result in the set of frequencies 330 being designated as to be avoided.

In some implementations, rather than designating the set of frequencies 330 as to be avoided, the corresponding RUs may be designated as a permanent or reserved low-rate/low-latency channel (e.g., occupying the 52 and 26 tone RUs starting at index 21 and 23 respectively), while using the remainder of the range 310 for all other communications.

In some implementations, rather than assigning the RUs 320a, 320b, 320c, and 320d to different stations, they could all be assigned to a single station and the data sent therein may or may not be sent in duplicate. For example, during typical operation according to the wireless standard 802.11ax, if the set of frequencies 330 was avoided during assignment of RUs by the access point, the largest portion of bandwidth that could be assigned to a single station would by the RU 320a. However, by assigning multiple RUs to the single station, the additional bandwidth of the RUs 320b, 320c, and 320d could be provided to the single station. Such an approach may permit an increase in the bandwidth available to a single station when avoiding troublesome frequency ranges (or a permanent low-rate/low-latency channel).

Figures 4A, 4B, 4C:
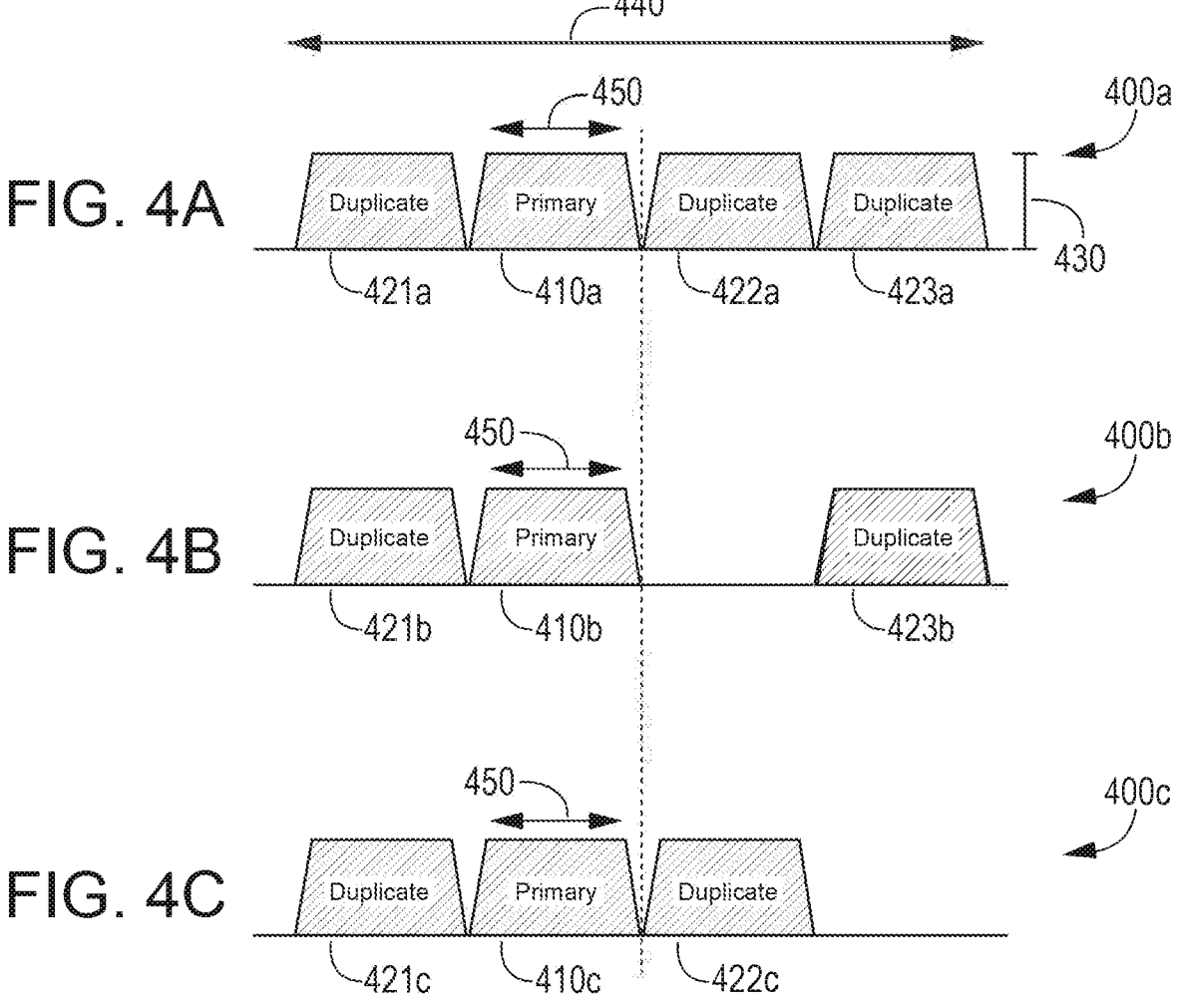
FIGS. 4A-4C illustrate example views of data sent in duplicate when subject to a power per unit frequency constraint described according to at least one implementation of the present disclosure.

FIGS. 4A-4C illustrate example views 400a, 400b, and 400c of data sent in duplicate when subject to a power per unit frequency constraint 430, in accordance with one or more implementations of the present disclosure. For example, an access point may be transmitting primary data 410 to a station that is experiencing high attenuation, and the access point may be subject to a constraint on the power spectral density (PSD). The primary data 410 may contain sufficient data to span a frequency range 450 and/or may be assigned the frequency range 450 by the access point for the primary data 410. When subject to the constraint 430, even if equipped with additional transmitting power or by switching to a lower frequency range (e.g., shifting from 40 MHz down to 20 MHz), the access point is prevented from boosting the transmission strength of the primary data 410. To increase the SNR at the receiving station, the access point may transmit the primary data 410 as duplicate instances 421, 422, and/or 423 of the data in different frequency ranges, thereby complying with the constraint 430 while still increasing the SNR.

For example, in the view 400a, the primary data 410a may occupy 40 MHz of bandwidth, and may also be transmitted in three additional 40 MHz bands of bandwidth as the duplicate instances 421a, 422a, and 423a, thereby designating an entire 160 MHz of bandwidth to the station with the data sent in four distinct instances, thereby providing a corresponding gain in SNR.

In the view 400b, the primary data 410b may occupy the same 40 MHz of bandwidth, and may also be transmitted in two additional 40 MHz bands of bandwidth as the duplicate instances 421b and 423b. However, as illustrated in FIG. 4B, the transmission may avoid one of the 40 MHz frequency ranges, which may be used for other transmissions, may be designated as to be avoided, or may otherwise be unused. In some implementations, the frequency ranges of the primary data 410b and the duplicate instances 421b and 423b may be non-contiguous such that there is a break in the frequency range from one instance of the data and another instance of the data. In the implementation illustrated in the view 400b, 120 MHz of non-contiguous bandwidth is designated to the station with the data sent in three distinct instances.

In the view 400c, the primary data 410c may occupy the same 40 MHz of bandwidth as the frequency range 450, and may also be transmitted in two additional 40 MHz bands of bandwidth as the duplicate instances 421c and 422c. However, as illustrated in FIG. 4C, the transmission may avoid one of the 40 MHz frequency ranges, which may be used for other transmissions, may be designated as to be avoided, or may otherwise be unused. In the implementation illustrated in the view 400c, 120 MHz of bandwidth is designated to the station with the data sent in three distinct instances.

FIG. 5 illustrates a flowchart of an example method 500 of transmitting data in duplicate, in accordance with one or more implementations of the present disclosure.

At block 510, an initial communication may be sent to a client device at a given transmission power. For example, the initial communication may be transmitted according to a constraint on the power spectral density.

At block 520, a client device may be identified for which communications with increased communication strength may be desired. For example, the client device may be at the periphery of the range of a transmitting device, may have a heavy wall in the transmission path, or may otherwise experience high attenuation. As another example, indicators of such conditions may be observed such as frequently dropped packets, repeated requests for a connection and trouble establishing or maintaining the connection, etc.

At block 530, multiple resource units may be selected to be used for the communications. For example, when generating an OFDMA frame or otherwise assigning RUs, the transmitting device may select multiple RUs for the client device identified in the block 520. In these and other implementations, the RUs may include the same or different number of tones, may be continuous portions of bandwidth or discontinuous, etc.

At block 540, a second radio band may be selected to be used for the communications. For example, the RUs selected at the block 530 may be associated with one radio band (e.g., 5 GHz), and a second radio band (e.g., 2.4 GHz) may be selected as another avenue across which additional instance (s) of the data may be provided in duplicate to the client device. In some circumstances, the transmitting device may perform such a selection based on a previous communication with the client device indicating an ability to communicate over both radio bands, and/or communicating over a higher radio band. For example, if communicating over 6 GHz, the transmitting device may assume that the client device is also able to communicate over 5 GHz and/or 2.4 GHz.

At block 550, a duplication indicator may be added to a packet for transmission to the client device, where the duplication indicator may signify that the packet includes data communicated in duplicate. For example, the duplication indicator may be one or more bits set in a header field, such as a SIG field, that the data is part of a duplicate transmission. In some implementations, the duplication indicator may indicate which RUs and/or frequency ranges are part of duplicate transmission, the order of duplication, the starting indices of the RUs carrying the data in duplicate, etc. Additionally or alternatively, the duplication indicator may indicate that the client device is to receive data in duplicate until informed otherwise.

At block 560, the data may be transmitted in duplicate via each of the multiple RUs and/or radio bands such that the multiple individual instances of the duplicate data can be combined by the client device into a single instance of the data. For example, if the client device were assigned two RUs, one with 106 tones and one RU with 242 tones, the transmitting device may send three instances of the data in duplicate, one in the 106 tone RU and two in the 242 tone RU. As a further example, the transmitting device may transmit the data using the same two RUs (106 and 242 tone RUs) where the two RUs may be in the 5 GHz radio band, and may also transmit the data in duplicate in the 2.4 GHz radio band.

FIG. 6 illustrates a flowchart of an example method 600 of designating certain resource units as to be avoided, in accordance with example implementations of the present disclosure.

At block 610, notification may be obtained of one or more frequency ranges corresponding to a set of resource units (RUs) to be avoided in a spectrum of available frequencies. For example, an access point may monitor for heavy interference that blocks given frequencies that correspond to a set of RUs and may designate those RUs as to be avoided. As another example, the access point may receive notification from a station, another access point (such as in a mesh network), an administrator, etc. that the set of RUs are to be avoided.

At block 620, RUs may be allocated to a set of client devices, where the RUs cover the available frequencies in the spectrum while excluding the set of RUs to be avoided. For example, an access point may assign RUs in an OFDMA frame that includes some or all of the RUs outside of the RUs to be avoided. Such an assignment of RUs may or may not include assignment of multiple RUs to a single station.

At block 630, the avoided RUs may be designated as a low-throughput, high-reliability range, and multiple RUs within the set of RUs to be avoided may be assigned to single client device. For example, in some implementations the designation of "to be avoided" may be a designation of avoidance for typical communications (e.g., when assigning RUs in an OFDMA frame, the set of RUs are to be avoided for typical stations). In such implementations, the set of RUs may be reserved for specific communications, such as a permanent or reserved low-throughput, high-reliability channel. Such a channel may be reserved and unused unless there is a station that would benefit from the use of the low-throughput, high-reliability channel. For example, the RUs may be avoided by the access point in assigning RUs unless a determination is made that a client device is experiencing high attenuation, is at the edge of the range of the access point, etc. and as such, would benefit from enhanced SNR even with decreased data rates. After identifying such a client device, the access point may assign the RUs within the range of RUs "to be avoided" to the client device to increase the robustness, reliability, and or range when communicating with the client device.

At block 640, the avoided RUs may be designated as unusable and multiple RUs may be assigned to a single client device outside of the range of RUs to be avoided. For example, the set of avoided RUs may correspond to high interference and as such, the access point may assign RUs to stations outside of the range of unusable RUs. In these and other implementations, the access point may assign multiple RUs to a single client device outside of the range of RUs to be avoided as they have been designated as unusable.

In some implementations, the designation of unusable or a reserved channel may occur as part of the obtaining of the notification of the block 610.

Figure 7:
FIG. 7 illustrates a flowchart of an example method of identifying resource units as to be avoided described according to at least one implementation of the present disclosure.

FIG. 7 illustrates a flowchart of an example method 700 of identifying resource units as to be avoided, in accordance with one or more implementations of the present disclosure.

At block 710, various frequencies may be monitored for interference. For example, a transmitting device such as an access point may periodically listen across a range of frequencies for interference. In some circumstances, the access point may store historical records of what frequencies had interference, the magnitude of the interference, etc. In some embodiments, messages may be received from other devices regarding interference experienced. For example, stations communicating with the access point may periodically identify frequencies at which they have observed interference.

At block 720, a determination may be made whether the interference of one or more ranges of the various frequencies are above a first threshold. For example, a given range of frequencies covering a set of RUs may experience extremely high interference, and that interference maybe compared to a first threshold level of interference. If the interference of the one or more frequencies is above the first threshold, the method 700 may proceed to the block 730. If the interference of the one or more frequencies is not above the first threshold, the method 700 may return to the block 710 to continue to monitor for interference.

At block 730, the one or more ranges of frequencies with interference that exceeds the first threshold may be designated as to be avoided. For example, the one or more ranges of frequencies may be designated as to be avoided and unusable due to the high interference. In these and other implementations, an access point may designate certain RUs as those covered by the one or more ranges of frequencies as to be avoided as the way in which the one or more ranges of frequencies are designated as to be avoided.

At block 740, the frequencies designated as to be avoided may be periodically monitored. Such periodic monitoring may be on a regular schedule, or may be intermittent, caused by a triggering event, or any other cause. For example, every few hours, once a day, etc., the to be avoided frequencies may be monitored for interference.

At block 750, a determination may be made as to whether the interference in the one or more frequencies designated as to be avoided is below a second threshold. If the interference is below the second threshold, the method 700 may proceed to the block 760. If the interference is not below the second threshold, the method 700 may return to the block 710 to continue to monitor the various frequencies for interference. In some implementations, after at least one range of frequencies has been designated as to be avoided, the blocks 740 and/or 750 may be repeated after the block 710.

At block 760, based on the interference being below the second threshold for the one or more frequencies to be avoided, the designation of to be avoided may be removed. For example, an access point that has been avoiding certain RUs may begin to assign the RUs corresponding to the one or more frequencies after removal of the designation of to be avoided.

FIG. 8 illustrates a flowchart of an example method 800 of receiving data in duplicate, in accordance with one or more implementations of the present disclosure.

At block 810, data may be received in duplicate at a client device via at least two resource units (RUs) from a transmitting device. For example, a station may receive duplicate instances of data in at least two RUs, where the duplicate data is sent as at least one separate instance in each of the RUs. In some implementations, the data may be received in duplicate over multiple radio bands in addition to or alternatively to being received in multiple RUS.

At block 820, each individual instance of the data received in duplicate may be demodulated. For example, signals received via one or more antennas of the client device may be separated into their constituent components by known processing techniques. For example, the client device may demodulate the symbols of the multiple RUs from an OFDMA transmission assigned to the client device. Additionally or alternatively, other signal processing or interpretation may be performed as part of the block 820 in extracting the individual instances of the data in the multiple RUs.

At block 830, each individual instance of the data may be stored in a common buffer or other storage area. For example, the individual instances may be stored in a manner where they may be processed to be combined.

At block 840, the multiple individual instances of the data received in duplicate may be combined into a single combined instance of the data. For example, the individual instances may be aligned (e.g., such that phase is matched) and coherently added. Combining the individual instances may result in $10*\log_{10}(N)$ gain in dB where N is the number of copies of the data received in duplicate.

One skilled in the art will appreciate that, for these and other processes and methods disclosed herein, the functions performed in the processes and methods may be implemented in differing order, simultaneously, etc. Furthermore, the outlined steps and operations are only provided as examples, and some of the steps and operations may be optional, combined into fewer steps and operations, or expanded into additional steps and operations without detracting from the essence of the disclosed implementations.

The subject technology of the present invention is illustrated, for example, according to various aspects described below. Various examples of aspects of the subject technology are described as numbered examples (1, 2, 3, etc.) for convenience. These are provided as examples and do not limit the subject technology. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example. The following is a non-limiting summary of some example implementations presented herein.

Example 1. A method includes selecting at least two resource units to be used for communications to a single client device; and transmitting data in duplicate via each of the at least two resource units to the client device such that the client device is able to combine the data from each of the at least two resource units into a single instance of the data.

Example 2. Another method includes obtaining notification of one or more ranges of frequencies corresponding to a set of resource units to be avoided in a spectrum of available frequencies; and allocating resource units to a set of client devices that covers the available frequencies while excluding the set of resource units to be avoided.

Example 3. An example client device includes one or more processors, and one or more non-transitory computer-readable media containing instructions that, when executed by the one or more processors, cause the client device to perform operations. The operations may include receiving data in duplicate via at least two resource units from a transmitting device, and demodulating each individual instance of the data in duplicate. The operations may also include storing each of the individual instances of the data received in duplicate in a common buffer. The operations may additionally include combining the individual instances of the data received in duplicate into a combined instance of the data, the combined instance of the data having a higher received strength compared to the individual instances of the data.

FIG. 9 illustrates a block diagram of an example computing system 2002 that may be used to perform or direct performance of one or more operations described according to at least one implementation of the present disclosure. The computing system 2002 may include a processor 2050, a memory 2052, and a data storage 2054. The processor 2050, the memory 2052, and the data storage 2054 may be communicatively coupled.

In general, the processor 2050 may include any suitable special-purpose or general-purpose computer, computing entity, or processing device including various computer hardware or software modules and may be configured to execute instructions stored on any applicable computer-readable storage media. For example, the processor 2050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute computer-executable instructions and/or to process data. Although illustrated as a single processor, the processor 2050 may include any number of processors configured to, individually or collectively, perform or direct performance of any number of operations described in the present disclosure.

In some implementations, the processor 2050 may be configured to interpret and/or execute computer-executable instructions and/or process data stored in the memory 2052, the data storage 2054, or the memory 2052 and the data storage 2054. In some implementations, the processor 2050 may fetch computer-executable instructions from the data storage 2054 and load the computer-executable instructions in the memory 2052. After the computer-executable instructions are loaded into memory 2052, the processor 2050 may execute the computer-executable instructions.

The memory 2052 and the data storage 2054 may include computer-readable storage media for carrying or having computer-executable instructions or data structures stored thereon. Such computer-readable storage media may include any available media that may be accessed by a general-purpose or special-purpose computer, such as the processor 2050. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2050 to perform a certain operation or group of operations.

Some portions of the detailed description refer to different modules configured to perform operations. One or more of the modules may include code and routines configured to enable a computing system to perform one or more of the operations described therewith. Additionally or alternatively, one or more of the modules may be implemented using hardware including any number of processors, microprocessors (e.g., to perform or control performance of one or more operations), DSP's, FPGAs, ASICs or any suitable combination of two or more thereof. Alternatively or additionally, one or more of the modules may be implemented using a combination of hardware and software. In the present disclosure, operations described as being performed by a particular module may include operations that the particular module may direct a corresponding system (e.g., a corresponding computing system) to perform. Further, the delineating between the different modules is to facilitate explanation of concepts described in the present disclosure and is not limiting. Further, one or more of the modules may be configured to perform more, fewer, and/or different operations than those described such that the modules may be combined or delineated differently than as described.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of configured operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. Computer-executable instructions may include, for example, instructions and data which cause a general-purpose computer, special-purpose computer, or special-purpose processing device (e.g., one or more processors) to perform or control performance of a certain function or group of functions.

Although the subject matter has been described in language specific to structural features and/or methodological acts, it is to be understood that the subject matter configured in the appended claims is not necessarily limited to the specific features or acts described above. Rather, the specific features and acts described above are disclosed as example forms of implementing the claims.

An example apparatus can include a Wireless Access Point (WAP) or a station and incorporating a VLSI processor and program code to support. An example transceiver couples via an integral modem to one of a cable, fiber or digital subscriber backbone connection to the Internet to support wireless communications, e.g. IEEE 802.11 compliant communications, on a Wireless Local Area Network (WLAN). The WiFi stage includes a baseband stage, and the analog front end (AFE) and Radio Frequency (RF) stages. In the baseband portion wireless communications transmitted to or received from each user/client/station are processed. The AFE and RF portion handles the upconversion on each of transmit paths of wireless transmissions initiated in the baseband. The RF portion also handles the downconversion of the signals received on the receive paths and passes them for further processing to the baseband.

An example apparatus can be a multiple-input multiple-output (MIMO) apparatus supporting as many as $N \times N$ discrete communication streams over N antennas. In an example the MIMO apparatus signal processing units can be implemented as $N \times N$. In various implementations, the value of N can be 4, 6, 8, 12, 16, etc. Extended MIMO operation enables the use of up to 2N antennae in communication with another similarly equipped wireless system. It should be noted that extended MIMO systems can communicate with other wireless systems even if the systems do not have the same number of antennae, but some of the antennae of one of the stations might not be utilized, reducing optimal performance.

Channel State Information (CSI) from any of the devices described herein can be extracted independent of changes related to channel state parameters and used for spatial diagnosis services of the network such as motion detection, proximity detection, and localization which can be utilized in, for example, WLAN diagnosis, home security, health care monitoring, smart home utility control, elder care, automotive tracking and monitoring, home or mobile entertainment, automotive infotainment, and the like.

Unless specific arrangements described herein are mutually exclusive with one another, the various implementations described herein can be combined in whole or in part to enhance system functionality and/or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive.

The scope of the invention is, therefore, indicated by the appended claims rather than by the foregoing description. All changes which come within the meaning and range of equivalency of the claims are to be embraced within their scope.

What is claimed is:

1. A method comprising:
obtaining notification of one or more ranges of frequencies corresponding to a 20 MHz resource unit to be avoided in a spectrum of available frequencies; and
allocating multiple resource units to a set of client devices that covers the available frequencies while excluding the one or more ranges of frequencies corresponding to the 20 MHz resource unit to be avoided, wherein allocating the multiple resource units comprises:
selecting at least two resource units outside of the 20 MHz resource unit to be used for communicating data to a single client device; and
assigning each remainder resource unit, outside of the at least two resource units and the 20 MHz resource unit, in either a multi-user multi-input multi-output (MU-MIMO) configuration, or a single-user multi-input multi-output (SU-MIMO) configuration.

2. The method of claim 1, wherein obtaining notification of the one or more ranges of frequencies is based on operations comprising:
monitoring the one or more ranges of frequencies for interference; and
detecting the interference for the one or more ranges of frequencies as above a threshold level of interference, wherein the one or more ranges of frequencies are designated as to be avoided based on the interference being above the threshold.

3. The method of claim 1, wherein the at least two resource units, the 20 MHz resource unit, and the remainder resource units comprise an orthogonal frequency-division multiple access (OFDMA) frame.

4. The method of claim 1, the multiple resource units being for an 80 MHz transmission.

5. The method of claim 4, the 80 MHz transmission including a multiple user (MU) transmission.

6. The method of claim 4, the 80 MHz including a 494-tone resource unit.

7. The method of claim 1, the multiple resource units being for a transmission relating to a 6 GHz band.

8. A system, comprising:
one or more processors; and
a memory comprising instructions that, when executed by the one or more processors, cause the system to perform operations comprising:
obtain notification of one or more ranges of frequencies corresponding to a 20 MHz resource unit to be avoided in a spectrum of available frequencies; and
allocate multiple resource units to a set of client devices that covers the available frequencies while excluding the one or more ranges of frequencies corresponding to the 20 MHz resource unit to be avoided, wherein when allocating the multiple resource units, the system is to:
select at least two resource units outside of the 20 MHz resource unit to be used for communicating data to a single client device; and
assign each remainder resource unit, outside of the at least two resource units and the 20 MHz resource unit, in either a multi-user multi-input multi-output (MU-MIMO) configuration, or a single-user multi-input multi-output (SU-MIMO) configuration.

9. The system of claim 8, wherein obtaining notification of the one or more ranges of frequencies is based on operations comprising to:

monitor the one or more ranges of frequencies for interference; and detect the interference for the one or more ranges of frequencies as above a threshold level of interference, wherein the one or more ranges of frequencies are designated as to be avoided based on the interference being above the threshold.

10. The system of claim 8, wherein the at least two resource units, the 20 MHz resource unit, and the remainder resource units comprise an orthogonal frequency-division multiple access (OFDMA) frame.

11. The system of claim 8, the operations further comprising to:

select at least two resource units outside of the 20 MHz resource unit to be avoided to be used for communicating data to a single client device in duplicate; and assign each remainder resource unit, outside of the at least two resource units selected for transmitting the data in duplicate and the 20 MHz resource unit to be avoided, to other client devices in a single-user multi-input multi-output (SU-MIMO) configuration.

12. The system of claim 8, the multiple resource units being for a 160 MHz transmission.

13. The system of claim 12, the 160 MHz transmission including a multiple user (MU) transmission.

14. The system of claim 12, the 160 MHz transmission including a 996-tone resource unit.

15. The system of claim 8, the multiple resource units being for a 320 MHz transmission.

16. The system of claim 15, the 320 MHz transmission including a multiple user (MU) transmission.

17. The system of claim 15, the 320 MHz transmission including at least one 996-tone resource unit.

18. The system of claim 8, the multiple resource units being for a transmission relating to a 6 GHz band.

* * * * *